United States Patent
DiPoala et al.

(10) Patent No.: US 10,473,777 B2
(45) Date of Patent: Nov. 12, 2019

(54) ASIC IMPLEMENTED MOTION DETECTOR

(71) Applicant: Robert Bosch GmbH, Stuttgart (DE)

(72) Inventors: William DiPoala, Fairport, NY (US); Lev Altman, Fairport, NY (US); Martin Pohlmann, Fairport, NY (US)

(73) Assignee: Robert Bosch GmbH, Stuttgart (DE)

( * ) Notice: Subject to any disclaimer, the term of this patent is extended or adjusted under 35 U.S.C. 154(b) by 394 days.

(21) Appl. No.: 15/253,835

(22) Filed: Aug. 31, 2016

(65) Prior Publication Data
US 2018/0059233 A1    Mar. 1, 2018

(51) Int. Cl.
| G01S 13/56 | (2006.01) |
| G01S 13/88 | (2006.01) |
| G08B 13/181 | (2006.01) |
| G01S 7/02 | (2006.01) |

(52) U.S. Cl.
CPC ............ G01S 13/56 (2013.01); G01S 13/886 (2013.01); G08B 13/181 (2013.01); *G01S 2007/027* (2013.01)

(58) Field of Classification Search
CPC ...... G01S 13/56; G01S 13/886; G08B 13/181
USPC ........................................................ 342/28
See application file for complete search history.

(56) References Cited

U.S. PATENT DOCUMENTS

| 5,351,054 A | 9/1994 | Fredericks et al. |
| 5,517,196 A | 5/1996 | Pakett et al. |
| 5,521,600 A | 5/1996 | McEwan |
| 6,239,736 B1 | 5/2001 | McDonald et al. |
| 6,420,995 B1 | 7/2002 | Richmond et al. |
| 6,535,161 B1 | 3/2003 | McEwan |
| 6,697,011 B2 | 2/2004 | Yabugaki |
| 7,952,515 B2 | 5/2011 | McEwan |
| 9,411,044 B1* | 8/2016 | Sperling ................... G01S 7/22 |
| 2004/0113831 A1* | 6/2004 | Gounalis ................. G01S 7/021 342/13 |
| 2008/0100510 A1* | 5/2008 | Bonthron ................ G01S 7/024 342/373 |
| 2008/0218339 A1* | 9/2008 | Royer .................... G01S 7/2922 340/552 |

(Continued)

FOREIGN PATENT DOCUMENTS

EP    2045621    4/2009

OTHER PUBLICATIONS

International Search Report for Application No. PCT/EP2017/068191 dated Oct. 11, 2017 (6 pages).

*Primary Examiner* — Timothy A Brainard
(74) *Attorney, Agent, or Firm* — Michael Best & Friedrich LLP (57) ABSTRACT

A motion detector and method of operating the motion detector including an antenna configured to transmit radio frequency (RF) signals and receive reflected RF signals. The motion detector also includes a controller configured to generate a notification when a target object is detected and an application specific integrated circuit (ASIC) electrically coupled to the antenna and the controller. The ASIC is configured to generate and send the RF signals to the antenna and to receive the reflected RF signals via the antenna. The ASIC also receives at least one control parameter from the controller and sends an output signal to the controller indicative of motion of a target object based on the at least one control parameter and the reflected RF signals.

18 Claims, 6 Drawing Sheets

(56) References Cited

U.S. PATENT DOCUMENTS

| | | | | |
|---|---|---|---|---|
| 2008/0243390 A1* | 10/2008 | Nakamori | .......... | G06K 9/00805 |
| | | | | 701/301 |
| 2010/0073218 A1* | 3/2010 | Stockmann | ........... | G01S 7/2923 |
| | | | | 342/146 |
| 2015/0160067 A1 | 6/2015 | Sai | | |

* cited by examiner

ASIC IMPLEMENTED MOTION DETECTOR

FIELD

Embodiments relate to radio frequency motion detectors.

BACKGROUND

Modern surveillance systems incorporate various types of sensors for detecting persons within an area under surveillance. In some instances, the surveillance systems include a motion detector that uses radio frequency (RF) waves to sense motion of objects within the area under surveillance. In such cases, the motion detector transmits an RF wave and receives a reflected RF wave from the object. Based on when the reflected waves are received, a distance between the object and the motion detector can be determined. The motion detector may monitor the distance between the object and the motion detector over time and trigger a notification or alarm when motion is detected. In this way, the motion detector may detect the presence of a person, for example an intruder, in the area under surveillance. Typically these types of motion detectors are constructed using a microcontroller and discrete components

SUMMARY

Embodiments provide, among other things, a system and a method of motion detection that provides a motion detector implemented using an application specific integrated circuit (ASIC). The ASIC communicates with a controller for range adjustment and alarm indication while performing radio frequency (RF) transmission and processing of RF reflections within the ASIC. This provides, among other things, relatively low-cost implementation of a motion detector.

One embodiment provides a motion detector including an antenna configured to transmit radio frequency (RF) signals and receive reflected RF signals. The motion detector also includes a controller configured to generate a notification when a target object is detected and an application specific integrated circuit (ASIC) electrically coupled to the antenna and the controller. The ASIC is configured to generate and send the RF signals to the antenna and to receive the reflected RF signals via the antenna. The ASIC also receives at least one control parameter from the controller and sends an output signal to the controller indicative of motion of a target object based on the at least one control parameter and the reflected RF signals.

Another embodiment provides a method of operating a motion detector. The method includes generating RF signals with an application specific integrated circuit (ASIC) and receiving reflected RF signals at the ASIC. A controller generates at least one control parameter and sends the at least one control parameter to the ASIC. The ASIC sends an output signal to the controller indicative of motion of a target object based on the at least one control parameter and the reflected RF signals. The controller then generates a notification when a target object is detected.

DETAILED DESCRIPTION

Before any embodiments are explained in detail, it is to be understood that the invention is not limited in its application to the details of construction and the arrangement of components set forth in the following description or illustrated in the following drawings. Embodiments are capable of being practiced or of being carried out in various ways.

Figure 1:
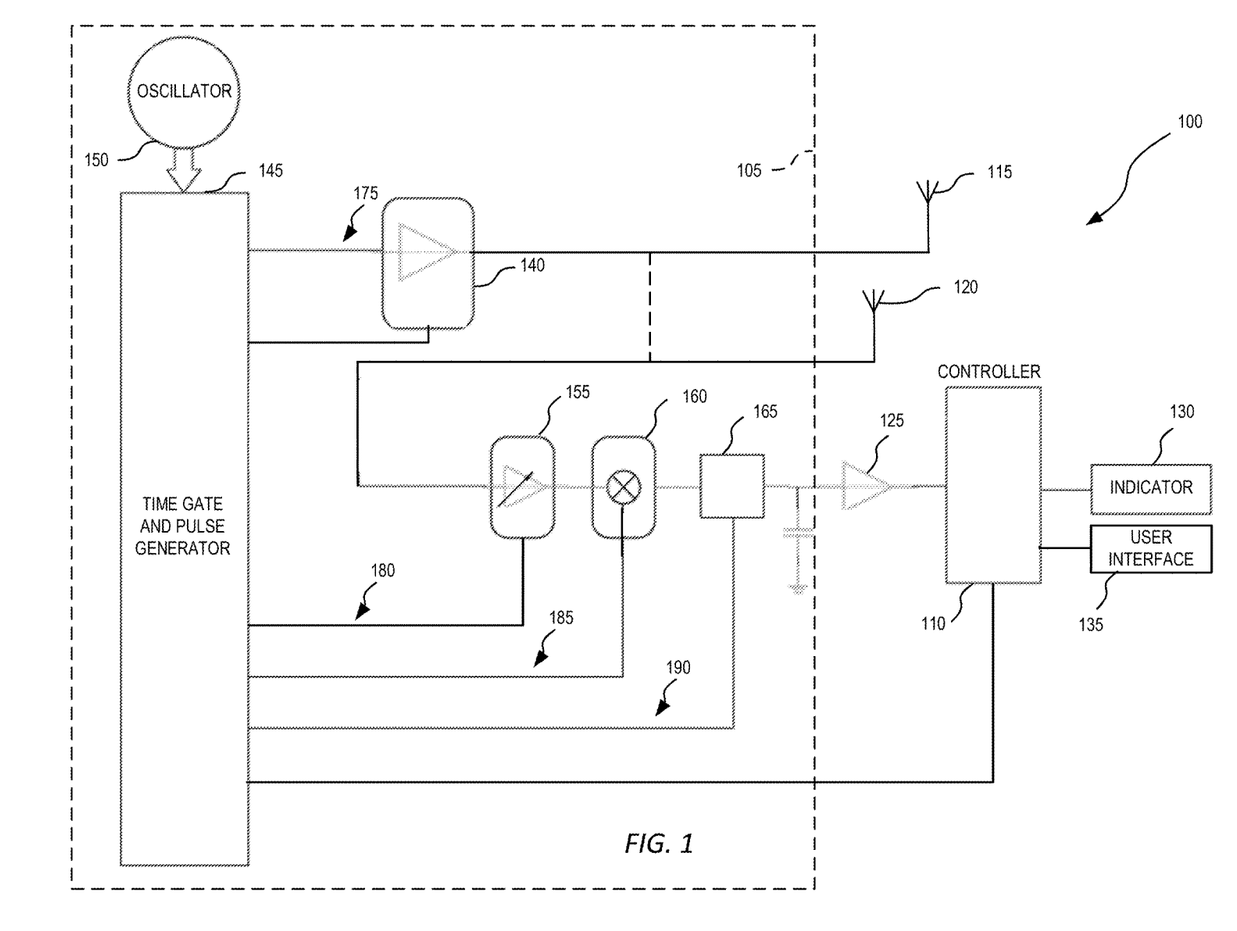
FIG. 1 is a diagram of a motion detector with an application specific integrated circuit (ASIC) and a controller according to one embodiment.

FIG. 1 illustrates a motion detector 100 according to one embodiment. In the example illustrated, the motion detector 100 includes an application specific integrated circuit (ASIC) 105, a controller 110, an antenna 115, an optional second antenna 120, an Op-amp 125, an indicator 130, and a user interface 135. The ASIC 105 includes a radio frequency (RF) shape generator 140 (for example, a RF burst generator), a time gate and pulse generator 145, an oscillator 150, a low-noise amplifier 155, a mixer 160, and a sample and hold circuit 165. FIG. 1 provides one example construction of the motion detector 100 with components deposed on the ASIC 105. However, configurations other than those illustrated and described herein are possible. In some embodiments, the ASIC 105 includes additional components including those illustrated outside of the ASIC 105. The ASIC 105 may also include an additional amplifier to perform gain control for normalization of the received signal with respect to distance to an object.

In the example illustrated, an output of the time gate and pulse generator 145 is electrically coupled to the RF shape generator 140, and the RF shape generator 140 is electrically coupled to the antenna 115. An input to the time gate and pulse generator 145 is communicatively coupled to the controller 110. In some embodiments, the time gate and pulse generator 145 and the controller 110 each include a serial peripheral interface (SPI). The SPI enables communication and control signals to be sent from the controller 110 to the time gate and pulse generator 145. Outputs of the time gate and pulse generator 145 are electrically coupled to the low-noise amplifier 155, the mixer 160, and the sample and hold circuit 165. The antenna 120 (e.g., a receiving antenna) is electrically coupled to an input of the low-noise amplifier 155 and an output of the low-noise amplifier 155 is electrically coupled to an input of the mixer 160. An output of the mixer 160 is electrically coupled to an input of the sample and hold circuit 165. An output of the sample and hold circuit 165 is electrically coupled to the Op-amp 125. An output of the Op-amp 125 is electrically coupled to the controller 110, and an output of the controller 110 is electrically coupled to the indicator 130. In some embodiments, the motion detector 100 may have a single antenna (for example, a mono-static radar antenna) for transmitting and receiving RF signals as indicated by a dashed line in FIG. 1 coupling the antenna 115 with the antenna 120.

Figure 3:
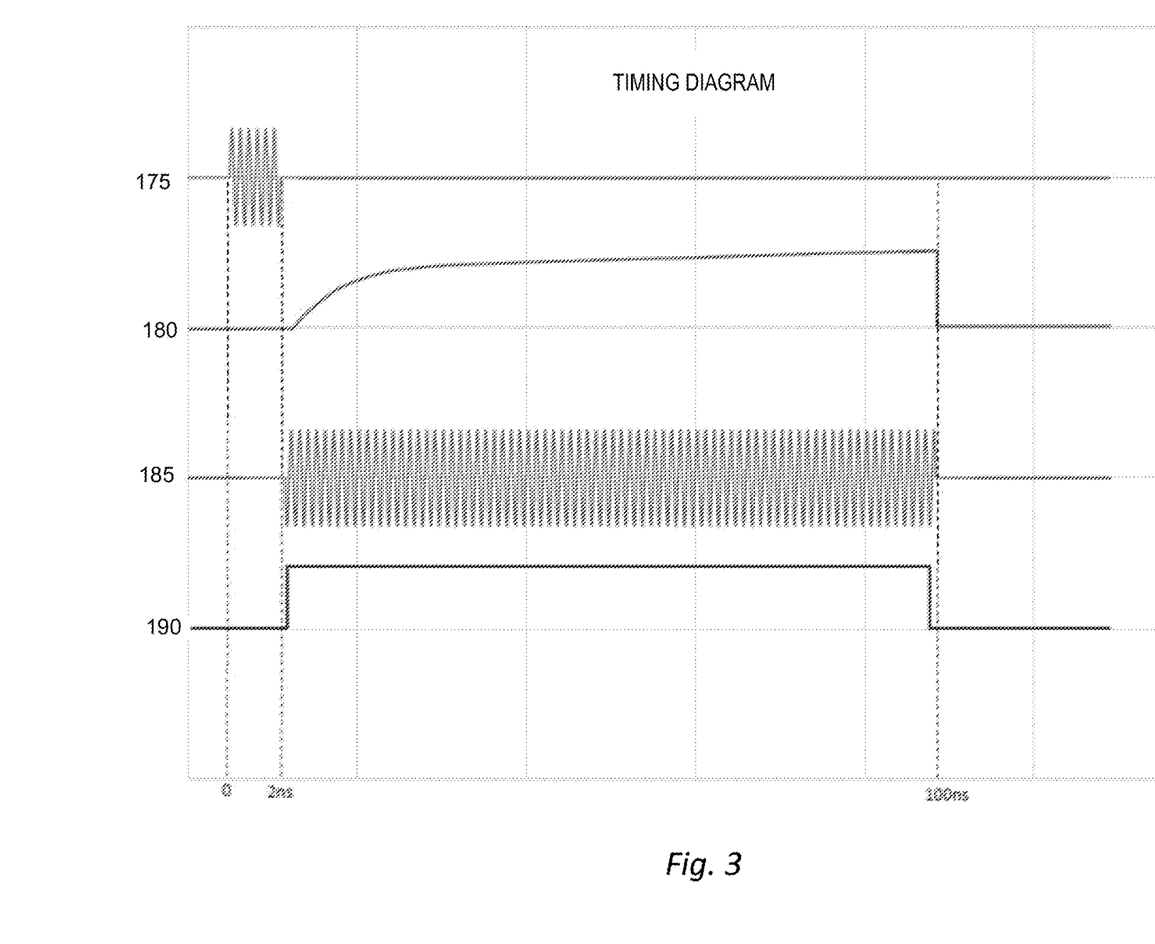
FIG. 3 is a diagram of a timing sequence for the ASIC of FIG. 1 according to one embodiment.

In some embodiments, the time gate and pulse generator 145 generates the control signals illustrated in FIG. 3. The control signals may be generated based on a control signal sent via the SPI from the controller 110. The control signals may include a control signal 175, a control signal 180, a control signal 185, and a control signal 190. In some embodiments, the time gate and pulse generator 145 generates the control signals based at least in part on control parameters selected at the user interface 135 and sent via the controller 110.

The motion detector 100 may use multiple forms of RF transmission and reception. For example, the motion detector 100 may use infrared, microwave, or both for transmission and reception of RF waves. In some embodiments, the motion detector 100 activates the indicator 130 based solely on a magnitude of the Doppler signal, as described below. In other embodiments, the motion detector 100 activates the indicator 130 based, at least in part, on the magnitude of the Doppler signal and another condition. For example, in some embodiments, the motion detector 100 sets a condition within the controller 110 indicative of a motion event based on the magnitude of the Doppler signal and activates the indicator 130 only upon confirmation of the motion event by another sensor located internally or externally from the motion detector 100. For example, in some embodiments, the indicator 130 is triggered based partially on stored information within the controller 110 indicative of whether the motion event was detected. In particular, the indicator 130 may be triggered based, at least in part, on activation of a bit in a register of the controller 110 indicative of the detection of the motion event. In this case, the indicator 130 may not be immediately triggered upon detection of a motion event. Rather, the indicator 130 may be triggered only when the bit indicates that the detection of the motion event has occurred and when the motion event is confirmed by another detector (for example, the infrared detector).

The indicator 130 and the user interface 135 may be of various forms and constructions. For example, the indicator 130 may include a visual device (for example, a light emitting diode (LED), an icon or light on a graphical display), an audio device (for example, a speaker, a siren, and the like), a haptic device (for example, a vibration alert device), or a combination of the foregoing. In some embodiments, the indicator 130 may include an alarm relay, an electronic switch, or other trigger that activates the indicator 130 based on a signal by the controller 110. The user interface 135 may include an output device for providing status information to a user. For example, the user interface 135 may include a display, lights, LEDs, a speaker, and the like. The user interface 135 may also include various input mechanisms for parameter selection by a user. For example, the user interface 135 may include buttons, selectable icons, switches, keys, and the like. Using the input mechanisms, a user may select control parameters that define detection ranges for the motion detector 100 as discussed below.

Figure 2:
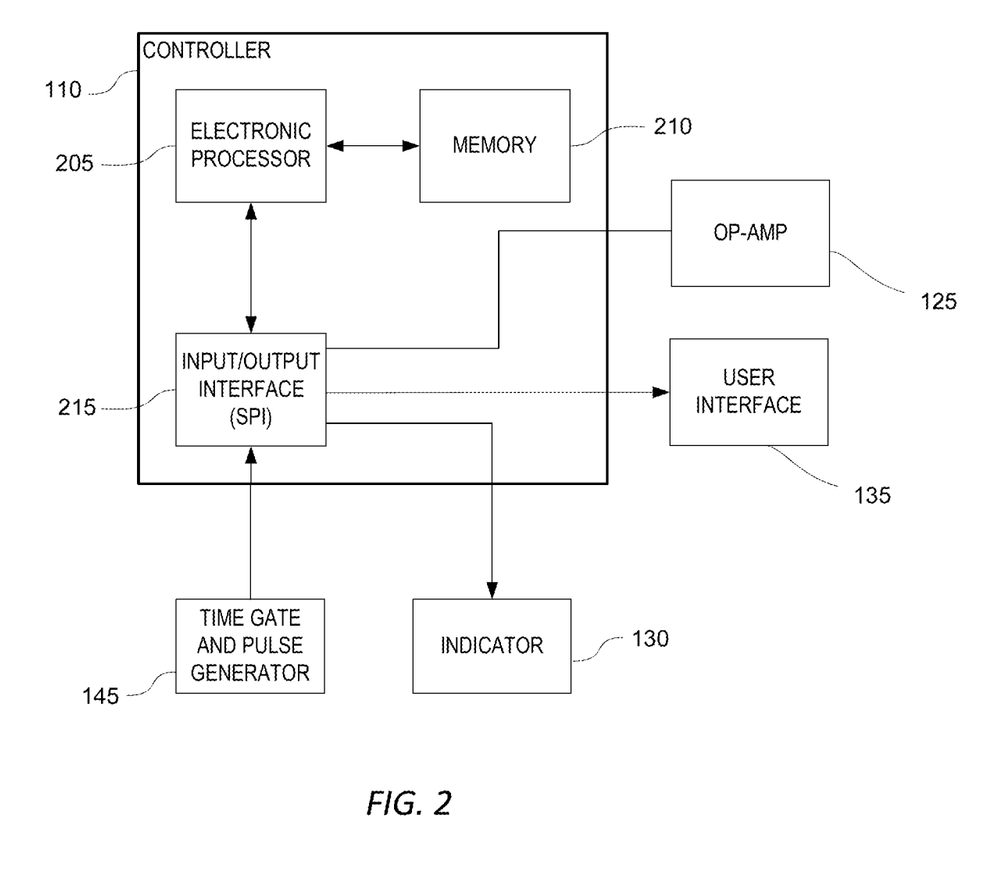
FIG. 2 is a diagram of the controller of FIG. 1 according to one embodiment.

FIG. 2 illustrates components of the controller 110 according to one embodiment. In the example illustrated, the controller 110 includes a plurality of electrical and electronic components that provide power, operation control, and protection to the components and modules within the controller 110. The controller 110 include, among other things, an electronic processor 205 (such as a programmable electronic microprocessor, microcontroller, or similar device), a memory 210 (for example, non-transitory, machine readable memory), and an input/output interface 215. The input/output interface 215 may include a separate or integrated SPI for communication with the time gate and pulse generator 145. The controller 110 may include additional electronic processors, memory, or input/outputs. The controller 110 may include, in addition to or in lieu of the electronic processor 205, application specific integrated circuits (ASICs), field programmable gate arrays (FPGAs), or both.

The controller 110 is configured to implement, among other things, portions of the processes and methods described herein. In other embodiments, the controller 110 may include additional, fewer, or different components.

The electronic processor 205 is communicatively coupled to the memory 210 and executes instructions which are capable of being stored on the memory 210. The electronic processor 205 is configured to retrieve from memory 210 and execute instructions related to the methods of operation of the motion detector 100. The electronic processor 205 is communicatively coupled to the input/output interface 215. The input/output interface 215 is communicatively coupled to hardware external to the controller 110. For example, the input/output interface 215 is communicatively coupled to the indicator 130 and the user interface 135. In some embodiments, the input/output interface 215 sends a control signal that defines the timing implemented by the control signals 275, 280, 285, 290. In some embodiments, the input/output interface 215 directly or indirectly activates an indication of motion (for example, an alarm) by means of a central security system, a messaging system, a security network, a local alarm (for example, an alarm light or siren), and the like.

FIG. 3 illustrates a diagram of a timing sequence for the control signals 275, 280, 285, 290 as generated by the time gate and pulse generator 145 according to one embodiment. FIG. 3 illustrates a single transmission and reception cycle (for example, occurring over 100 nanoseconds). The transmission and reception cycle that is illustrated in FIG. 3 may be generated to reoccur periodically, for example, every 1000 nanoseconds. The timing sequences and control signals will be referenced in discussion of the methods described below.

Figure 4:
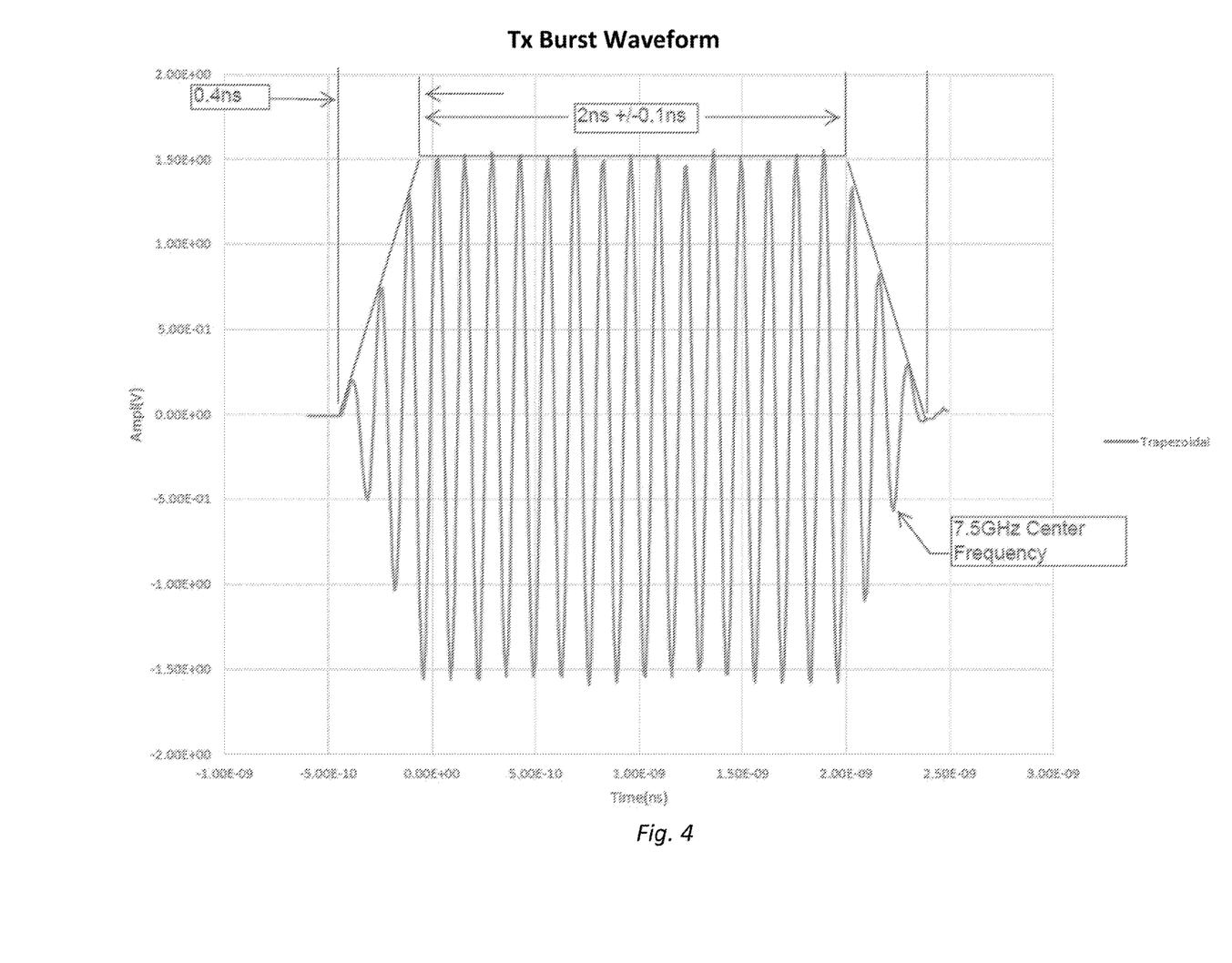
FIG. 4 is a diagram of a radio frequency (RF) transmission burst from the motion detector of FIG. 1 according to one embodiment.

During operation of the motion detector 100, the control signal 175 is sent from the controller 110 to the RF shape generator 140. Based on the control signal 175, the RF shape generator 140 generates an RF burst according to a frequency and a time period of activation based on the control signal 175. FIG. 4 illustrates one example of an RF burst. In one example, the RF burst may be a transmission of RF energy at approximately 7.5 Giga-Hertz. The RF shape generator 140 may generate the RF burst over a time range of 0 to 2 nanoseconds while the control signal 175 is active. The RF burst may be a burst waveform of 500 Mega-Hertz bandwidth for ultra-wideband operation. The RF burst may be generated by the RF shape generator 140 in accordance with various RF regulations for transmitted RF waves. For example, The RF burst may be shaped to comply with Federal Communications Commission (FCC) parts 15.517 and 15.521 and European Communications Committee (ECC) technical requirements (CEPTREP034.pdf) including harmonics (−41.3 dBm/MHz EIRP, 0 dBm Peak EIRP, Bandwidth >500 MHz).

Figure 5:
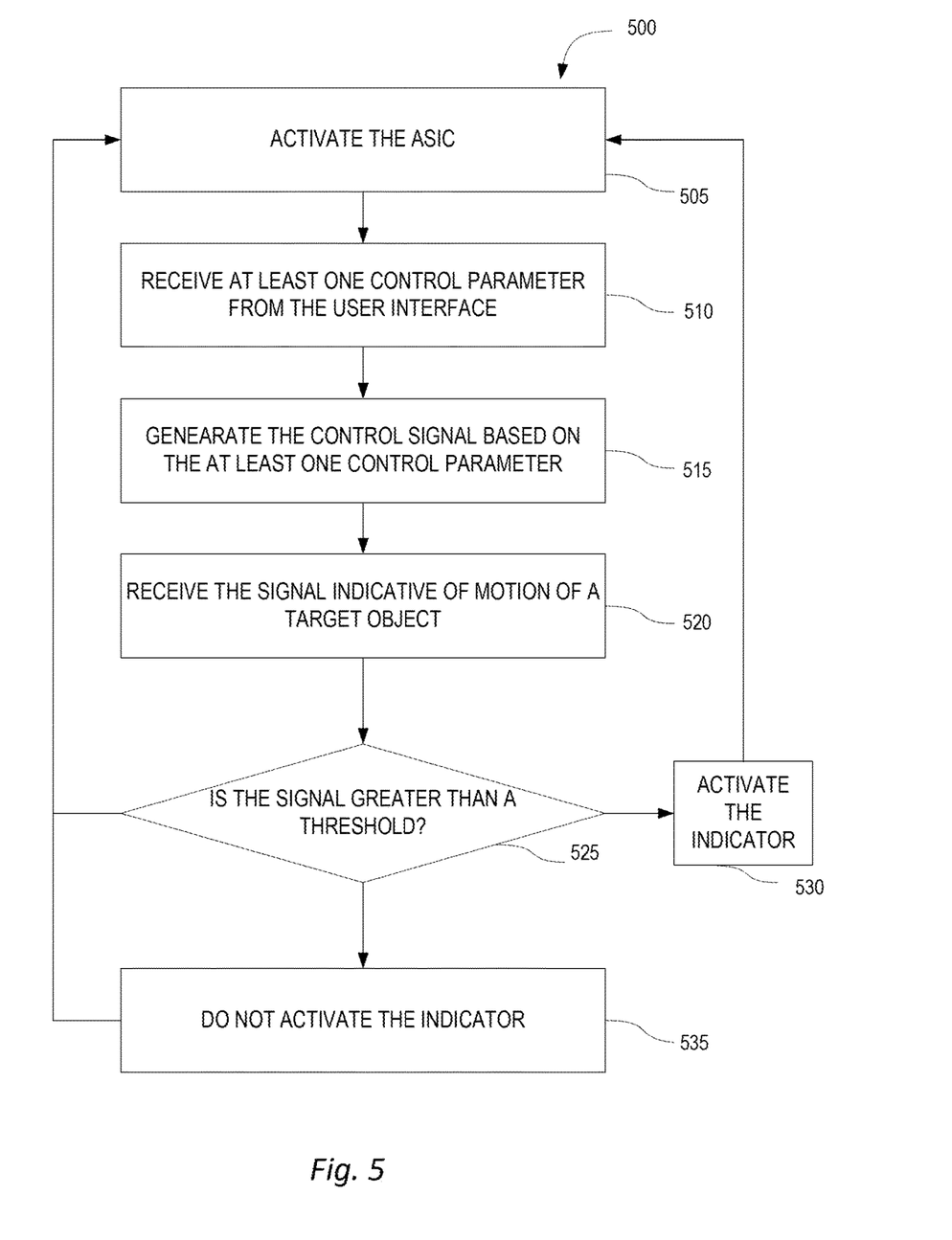
FIG. 5 is a flowchart of a method of operation of the controller of FIG. 1 according to one embodiment.

FIG. 5 illustrates a method 500 of operating the controller 110 of the motion detector 100 according to one embodiment. In the embodiment illustrated, the controller 110 activates the ASIC 105 (block 505). At least one control parameter is received from the user interface 135 (block 510). The control parameter may be received by selections entered or updated at the user interface 135 at various times by a user, installer, or manufacturer of the motion detector 100. The controller 110 generates the control signal based on the at least one control parameter and sends the at least one control parameter to the ASIC 105 over the SPI connection (block 515). During operation of the motion detector 100, the ASIC 105 generates a signal indicative of motion of a target object. The signal is then received at the controller 110

(block 520). The controller 110 determines if the signal is greater than a predetermined threshold (block 525). When the signal is greater than the predetermined threshold, this indicates that motion of the object is greater than a particular amount of movement, and the controller 110 activates the indicator 130 (block 535). When the signal is lower than the predetermined threshold, this indicates that motion of the object is less than the particular amount of movement, and the controller 110 does not activate the indicator 130 (block 530).

Figure 6:
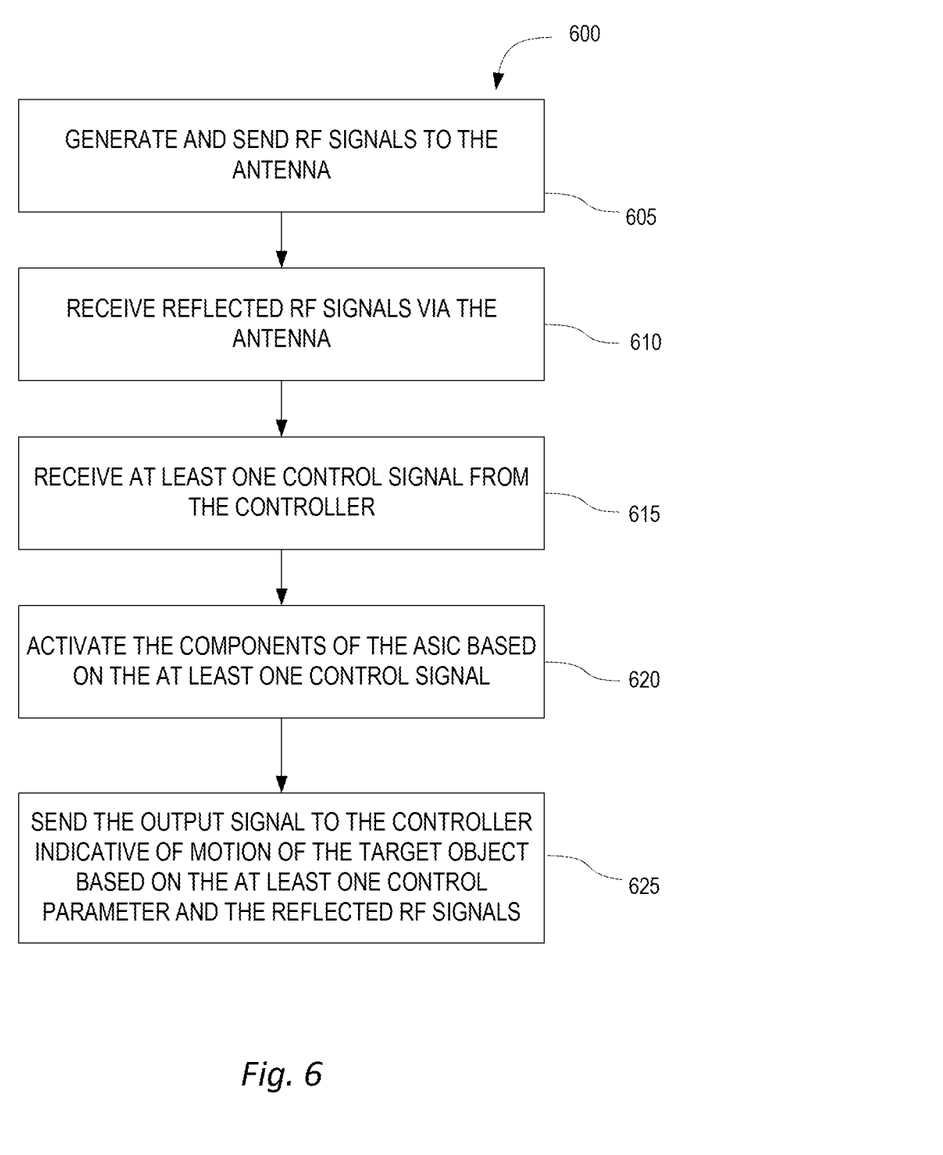
FIG. 6 is a flowchart of a method of operation of the ASIC of FIG. 1 according to one embodiment.

FIG. 6 illustrates a method 600 of operating the ASIC 105 according to one embodiment. In the embodiment illustrated, the ASIC 105 generates and sends RF signals (i.e., a series of RF bursts) to the antenna 115 (block 605). The ASIC 105 receives reflected RF signals from the target object via the antenna 115 (block 610). The ASIC 105 also receives at least one control signal from the controller 110 with control parameters (block 615). The ASIC 105 activates the components of the ASIC 105 based on the control parameters received in the control signal (block 620) as detailed below. The ASIC 105 then sends the output signal of the ASIC 105 to the controller 110, which is indicative of motion of the target object and is dependent on the at least one control parameter and the reflected RF signals (block 625).

In performance of the method 600 (at block 620), the controller 110 generates the control signal 185 and outputs the control signal 185 to the mixer 160. The mixer 160 provides a Doppler signal based on a combination of the control signal 185 and the received RF signal. For example, the Doppler signal may represent a difference between the control signal 185 and the received RF signal. The Doppler signal may have a low frequency (for example, 0.1 to 100 Hertz). The control signal 185 sets a detection range for the motion detector 100. For example, the control signal 185 may be active for 100 nanoseconds to provide a particular detection range for the motion detector 100. Since it takes approximately 2 nanoseconds for the transmitted RF wave to be reflected back to the antenna 120 for each foot of detection range, a 100 nanosecond control signal limits the detection range to 50 feet. As a consequence, reflected RF waves received after 100 nanoseconds do not create the Doppler signal due to the lack of the control signal 185 after 100 nanoseconds.

The controller 110 also generates the control signal 190 and sends the control signal 190 to the sample and hold circuit 165. As illustrated by FIG. 3, the control signal 190 may be a 100 nanosecond pulse to activate the sample and hold circuit 165 during reception of the reflected signal. Since the transmitted RF wave may be transmitted as a burst, the sample and hold circuit 165 converts the Doppler signal, which also may be received as a burst, into a continuous wave signal. In some embodiments, a signal from the output of the sample and hold circuit 165 is amplified by the Op-amp 125 before being sent to the controller 110.

Since the control signals 175, 180, 185, 190 are at least partially controlled based on the control signal received from the controller 110, the control parameters may define a minimum detection range and a maximum detection range of the motion detector 100. The minimum detection range may be adjustable between, for example, 2 to 10 feet. The time gate and pulse generator 145 controls the processing of the reflected RF signals by controlling the timing of the control signals 175, 180, 185, 190. For example, the time gate and pulse generator 145 may activate the control signal 190 to activate the sample and hold circuit 165 between 4 to 20 ns for the minimum detection range. The minimum range of 4 to 20 ns may be adjusted by parameters received from the user interface 135 in, for example, 2 ns steps. The 4 to 20 ns adjustment window corresponds to the 2 to 10 feet of adjustable minimum detection range. Additionally, the time gate and pulse generator 145 may activate the sample and hold circuit 165 between 6 to 200 ns corresponding to between 3 to 100 feet for the maximum detection window. The maximum range of 6 to 200 ns may be adjusted by the parameters received from the user interface 135 in, for example, 20 ns steps.

As illustrated by FIG. 3, the controller 110 may adjust the control signal 180 to increase the gain of the low-noise amplifier 155 or decrease attenuation of a variable attenuator positioned in series (not shown) over the time period that it is active. For example, the control signal 180 may be active for approximately 100 nanoseconds depending on the desired range of the motion detector 100. As a consequence, the received RF signal is adjusted to compensate for RF reflections received at various amplitudes corresponding to various distances. In particular, RF reflections that are received later in the reception cycle are naturally attenuated due to travelling a greater distance (for example, due to dispersion), and thus result in lower amplitude received signals. The adjustment, by the controller 110, to the control signal 180, increases the amplitude of these lower amplitude received signals.

Thus, embodiments of the invention provide, among other things, a motion detector implemented at least in part on an ASIC and a method of performing motion detection by the ASIC and a controller. Various features and advantages of the embodiments of the invention are set forth in the following claims.

What is claimed is:

1. A motion detector comprising:
   an antenna configured to transmit radio frequency (RF) signals and receive reflected RF signals;
   a controller configured to generate a notification when a target object is detected; and
   an application specific integrated circuit (ASIC) electrically coupled to the antenna and the controller, the ASIC configured to
      generate and send the RF signals to the antenna;
      receive the reflected RF signals via the antenna;
      receive at least one control parameter from the controller;
      adjust signal processing of the reflected RF signals to set a detection range based on the at least one control parameter; and
      send an output signal to the controller indicative of motion of a target object based on the at least one control parameter and the reflected RF signals.

2. The motion detector of claim 1, further comprising a user interface communicatively coupled to the controller, wherein the controller is configured to send the at least one control parameter to the ASIC based on selections received from the user interface.

3. The motion detector of claim 1, further comprising an alarm relay communicatively coupled to the controller, wherein the controller is further configured to generate the notification when a magnitude of the output signal is greater than a predetermined threshold.

4. The motion detector of claim 1, wherein the ASIC includes
   a low noise amplifier electrically coupled to the antenna;
   a mixer electrically coupled to the low noise amplifier;
   a sample and hold circuit electrically connected to the mixer; and a time gate and pulse generator electrically connected to the low noise amplifier, the mixer, and the sample and hold circuit, wherein the time gate and pulse generator receives the at least one control parameter from the controller and controls timing of control signals to the low noise amplifier, the mixer, and the sample and hold circuit based on the at least one control parameter.

5. The motion detector of claim 4, wherein the ASIC further includes a pulse generator electrically coupled to the antenna and the time gate and pulse generator, the pulse generator configured to generate a wideband RF pulse based on a control signal sent by the time gate and pulse generator; and an oscillator electrically coupled to the time gate and pulse generator.

6. The motion detector of claim 1, wherein the ASIC is configured to adjust the detection range by setting a minimum detection distance and a maximum detection distance for the target object based on the at least one control parameter.

7. The motion detector of claim 1, wherein the ASIC is configured to generate a Doppler signal indicative of a motion of the target object relative to the motion detector based on the reflected RF signal.

8. The motion detector of claim 1, wherein the ASIC is further configured to normalize a magnitude of the reflected RF signals by adjusting a sensitivity to the reflected RF signals of the ASIC over a predetermined time, the predetermined time based on the at least one control parameter.

9. The motion detector of claim 1, wherein the controller and the ASIC each include a serial peripheral interface that is configured to control transmission of the at least one control parameter, and wherein the at least one control parameter defines start and stop times for processing the reflected RF signal internally within the ASIC.

10. A method of operating a motion detector, the method comprising:
generating RF signals with an application specific integrated circuit (ASIC);
receiving reflected RF signals at the ASIC;
generating, by a controller, at least one control parameter;
sending the at least one control parameter to the ASIC;
adjusting processing of the reflected RF signals to set a detection range based on the at least one control parameter;
sending an output signal from the ASIC to the controller indicative of motion of a target object, the output signal being dependent on the at least one control parameter and the reflected RF signals; and
generating, by the controller, a notification when a target object is detected.

11. The method of claim 10, further comprising receiving a selection of parameters from a user interface, and wherein generating, by the controller, the at least one control parameter is based on the selection of parameters.

12. The method of claim 10, wherein generating the notification occurs when a magnitude of the output signal is greater than a predetermined threshold.

13. The method of claim 10, further comprising: receiving, at a time gate and pulse generator, the at least one control parameter from the controller; and controlling timing of control signals to a low noise amplifier, a mixer, and a sample and hold circuit based on the at least one control parameter.

14. The method of claim 13, further comprising generating a wideband RF pulse based on a control signal sent by the time gate and pulse generator.

15. The method of claim 10, further comprising setting a minimum detection distance and a maximum detection distance for the target object based on the at least one control parameter.

16. The method of claim 10, further comprising generating a Doppler signal indicative of a motion of the target object relative to the motion detector based on the reflected RF signal.

17. The method of claim 10, further comprising normalizing a magnitude of the reflected RF signals by adjusting a sensitivity to the reflected RF signals of the ASIC over a predetermined time, the predetermined time based on the at least one control parameter.

18. The method of claim 10, wherein sending the at least one control parameter to the ASIC includes sending the at least one control parameter via a serial peripheral interface, and wherein the at least one control parameter defines start and stop times for processing the reflected RF signal internally within the ASIC.

* * * * *